United States Patent [19]

Huber

[11] 4,273,228
[45] Jun. 16, 1981

[54] FRICTION CLUTCH

[75] Inventor: Lothar Huber, Bühl, Fed. Rep. of Germany

[73] Assignee: Luk Lamellen und Kupplungsbau GmbH, Bül, Fed. Rep. of Germany

[21] Appl. No.: 892,924

[22] Filed: Apr. 3, 1978

[30] Foreign Application Priority Data

Apr. 2, 1977 [DE] Fed. Rep. of Germany ....... 2714861

[51] Int. Cl.³ .............................................. F16D 13/44
[52] U.S. Cl. .................................................. 192/89 B
[58] Field of Search ........................... 192/89 B, 70.27

[56] References Cited

U.S. PATENT DOCUMENTS 4,084,674  4/1978  Gennes ................................ 192/89 B

FOREIGN PATENT DOCUMENTS 2242892  3/1975  France .................................. 192/89 B
100061  9/1973  German Democratic Rep. .

Primary Examiner—Rodney H. Bonck
Attorney, Agent, or Firm—Herbert L. Lerner

[57] ABSTRACT

A friction clutch wherein, for pivotally mounting a plate spring thereof at a clutch cover, first bracing means are provided at the cover side of the plate spring and second bracing means are provided at the side of the plate spring facing away from the clutch cover and, for forming the second bracing means, holding means punched out of the material of the clutch cover and bent away extend through recesses formed in the plate spring, the holding means being formed from the cover by a punched-out section disposed in a direction selected from the group thereof consisting of a chord direction and circumferential direction of the cover and diverted so as to extend in a substantially radial direction and perpendicularly to the plane of rotation of the clutch.

20 Claims, 5 Drawing Figures

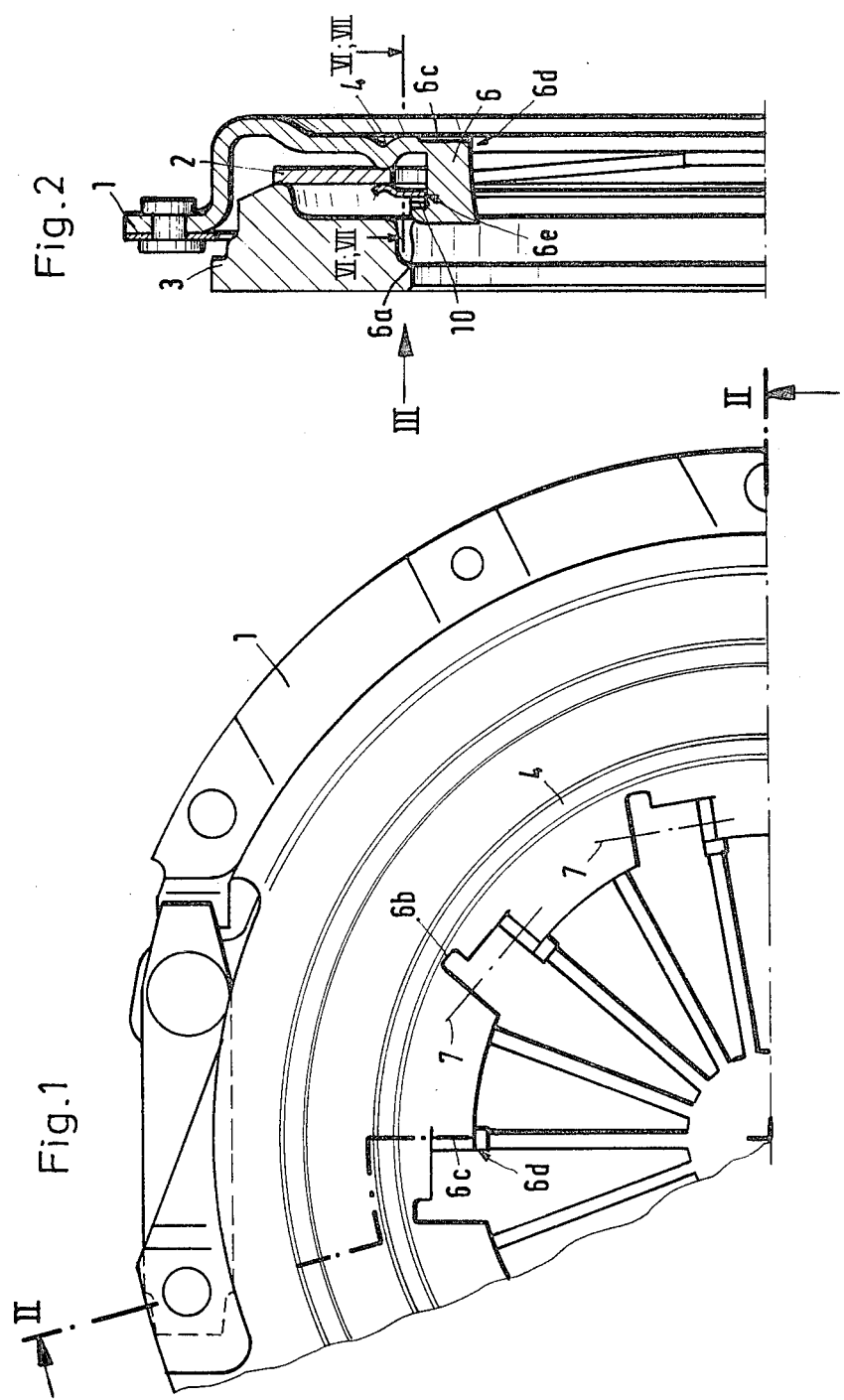

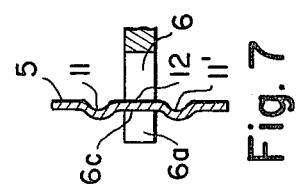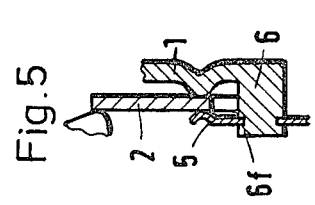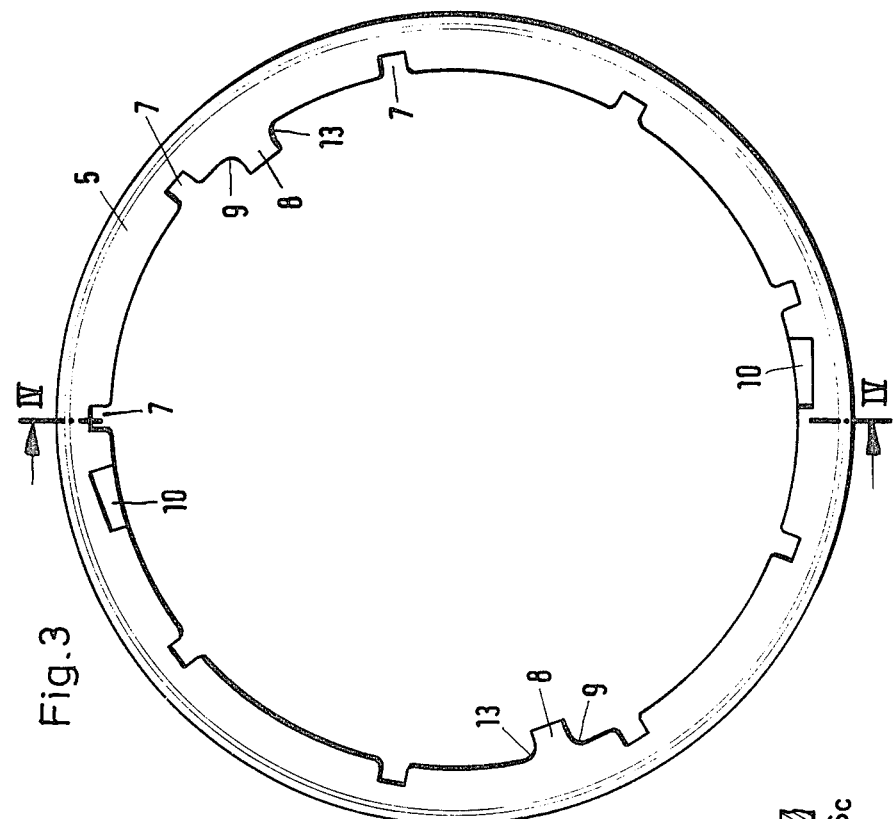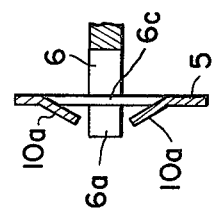

FRICTION CLUTCH

The invention relates to a friction clutch wherein, for pivotally mounting a plate spring thereof at a clutch cover, first bracing means are provided at the cover side of the plate spring and second bracing means are provided at the side of plate spring facing away from the clutch cover and, for forming the second bracing means, holding means punched out of the material of the clutch cover and bent away extend through recesses formed in the plate spring.

Such a friction clutch, as has become known heretofore from German Patent DL-PS 100 061, is provided with holding means formed by stamping or punching out of the clutch cover a punched-out section extending in radial direction and bent away by bending operations in radial direction in a manner that the holding means extend through the plate spring and, with regions thereof bent radially outwardly, form a bracing or a pivot bearing, on a side of the plate spring facing away from the clutch cover, through direct engagement with the plate spring, or the radially outwardly bent regions thereof retainingly grip an intermediate member such as a wire ring, for example.

In such friction clutches, a disadvantage arises in that the guidance surfaces which are formed by the regions of the holding means that extend through the plate spring are relatively narrow and can be kept parallel only with great difficulty because of punching breaks and deformations occurring due to the bending operations. Furthermore, assembly of such heretofore known friction clutches demands a high tool expenditure in order to ensure exact bending back and away.

It is accordingly an object of the invention to provide a friction clutch which avoids the foregoing disadvantages of the heretofore known friction clutches and which is distinguished by a more simplified assembly as well as more economical manufacture and which, during construction thereof, afford the maintenance of exact dimensions and tolerances required for the function or operation thereof.

With the foregoing and other objects in view, there are provided, in accordance with the invention, in a friction clutch wherein, for pivotally mounting a plate spring thereof at a clutch cover, first bracing means located at the cover side of the plate spring and second bracing means located at the side of the plate spring facing away from the clutch cover and, for forming the second bracing means, holding means punched and bent away extend through recesses formed in the plate spring, the holding means being formed from the cover by a punched-out section disposed in a direction selected from the group thereof consisting of a chord direction and a circumferential direction of the cover and diverted so as to extend in a substantially radial direction and perpendicularly to the plane of rotation of the clutch.

In accordance with another feature of the invention, the bending or bent-away section, as viewed in direction of the clutch axis, extends substantially in radial direction. The punching or stamping and the bending operations can be effected thereby in an especially salutary manner and with relatively simple tools. Furthermore, maintenance of the size or mass necessary for proper functioning of the clutch is afforded in an especially simple manner.

Along a provided bending line, in accordance with a further feature of the invention, a nominal or desired bending location is formed, advantageously at the side of the plate spring facing away from the cover, and extending substantially in radial direction. This nominal bending location may be formed, for example, by a notch, or indentation or the like.

In accordance with an added feature of the invention, the holding means has, at an end thereof directed away from the bending location, a holding region punched out therewith for retaining the second bracing means.

In accordance with an additional feature of the invention, the second bracing means comprise an annular plate-like bracing member fixed by the holding region, the bracing member being resilient.

In accordance with yet another feature of the invention, the holding region comprises a projection formed on the holding means and extending in radial direction. The holding region can also be formed, however, by a punched-out or formed rivetable section for a bracing member such as an annular plate-like bracing member, for example.

In accordance with yet a further feature of the invention, the holding region comprises a riveting connection of the holding means and the second bracing means.

In accordance with yet an added feature of the invention, the holding means has a bearing region at which it engages the second bracing means, the bearing region, at least at the surface thereof, having a hardness greater than that at the remaining region of the holding means. This greater hardness may be formed, for example, by induction hardening, by applying a layer of wear-resistant material or the like.

In accordance with yet an additional feature of the invention, the friction clutch includes a bayonet-like locking connection operative between the holding means and the second bracing means provided at the side of the plate spring facing away from the cover.

In accordance with another feature of the invention, the holding means are formed with profiled portions constituting one part of the bayonet-like locking connection, and the bracing means comprise an annular plate-like member formed with recesses constituting the other part of the bayonet-like locking connection.

In accordance with a further feature of the invention, the bayonet-like locking connection comprises a plug-and-turn connection.

In accordance with an added feature of the invention, the bayonet-like locking connection has a protective device for protecting against rotation of the second bracing means with the clutch.

In accordance with an additional feature of the invention, the protective device is operatively associated with the second bracing means and the holding means or also with the plate spring, the cover or the like.

In accordance with alternate features of the invention, the protective device is effective for protecting against rotation of the second bracing means with the clutch in both or only in one rotary direction.

In accordance with yet another feature of the invention, the second bracing means comprise an annular plate-like bracing member formed with cut-outs at a radially inner contour thereof, the cut-outs having a width, as viewed in circumferential direction of the annular plate-like member, affording sliding of the annular plate-like member in axial direction over the holding means.

In accordance with yet a further feature of the invention, the second bracing means comprise an annular plate-like bracing member formed with contours engageable by a tool for rotation of the annular bracing member relative to the holding means.

In accordance with yet an added feature of the invention, the contours are engageable by the tool for rotation of the annular bracing member relative to the holding means in both directions of rotation so as to release or loosen the locking connection.

In accordance with yet additional alternate features of the invention, the contours are formed by hole-like cut-outs or of radially inwardly directed tabs extending from the annular plate-like bracing member.

In accordance with another feature of the invention, the second bracing means comprise an annular plate-like bracing member formed with radial recesses along the inner circumference thereof, the annular plate-like member being formed behind at least one of the radial recesses with an inclined surface rising in axial direction of the clutch, as viewed in circumferential direction of the annular plate-like member.

In accordance with a further feature of the invention, the inclined surface, as viewed in circumferential direction of the annular plate-like member, merges into a reversing surface extending in opposite axial direction. An antirotation protective device can be formed at least in one direction of rotation.

In accordance with an added feature of the invention, in connection with the reversing surface, as viewed in circumferential direction of the annular plate-like member, an additional section is formed on the annular plate-like member and projects in a direction corresponding to the direction in which the inclined surface extends.

In accordance with an additional feature of the invention, the inclined surface is formed of a punched-out section extending substantially in circumferential direction.

In accordance with yet another feature of the invention, an end of the punched-out section directed in one circumferential direction forms an antirotation protective device on a contour of the holding means extending in axial direction, when the annular plate-like second bracing means has been slipped in axial direction over the holding means and relative rotation or turning of this annular plate-like bracing means with respect to the holding means has been effected in accordance with the puched-out section.

In accordance with a concomitant feature of the invention, another antirotation protective device is provided at the annular plate-like member and is effective in the other circumferential direction, the other antirotation protective device being symmetric to a symmetry plane extending in radial direction i.e. being a mirror image thereto. Thus, an antirotation protective device effective in both directions of rotation can be provided.

Other features which are considered as characteristic for the invention are set forth in the appended claims.

Although the invention is illustrated and described herein as embodied in a friction clutch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a front elevational view of part of a friction clutch constructed in accordance with the invention;

FIG. 2 is a half-sectional view of FIG. 1 taken along the line II—II in direction of the arrows;

FIG. 3 is a front elevational view of a detail of FIG. 2 seen in direction of the arrow III and fully showing a plate-like bracing means thereof;

FIG. 4 is a cross-sectional view of FIG. 3 taken along the line IV—IV in direction of the arrows;

FIG. 5 is an enlarged fragmentary view of FIG. 2 showing a modification in the construction of the friction clutch; and FIGS. 6 and 7 are fragmentary cross-sectional views of FIG. 2 taken, respectively, along coincident lines VI—VI and VII—VII, showing different modifications of the friction clutch structure.

Referring now to the drawing and first, particularly, to FIGS. 1 and 2 thereof, there is shown a friction clutch according to the invention which is formed, in a conventional manner, of a cover 1 at which a plate spring 2 acting upon a pressure plate 3 is pivotally mounted. For mounting or bearing the plate spring 2, the cover 1 is provided with bracing means in the form of a circular arrangement of corrugations or a bead 4, and annular plate-like bracing means 5 (also see FIGS. 3 and 4) are disposed on the side of the plate spring 2 facing away from the cover 1, the bracing means 5 by itself forming a support or bearing for the plate spring 2 and being retained by holding means 6 that extend through the plate spring 2, the holding means 6 being formed with noses or projections 6a extending in radial direction of the clutch and providing the support or bearing for the annular plate-like bracing means 5.

The holding means 6 are shown, in the illustrated embodiment of FIG. 2, as being formed out of the material of the cover 1, by being stamped or punched out of the cover material in a shape corresponding at least nearly to respective sections 6b extending in circumferential direction of the cover 1 or in accordance with the direction of a chord 7, and these stamped-out sections are then diverted or bent away into a plane that is substantially rectangular to the plane of rotation of the clutch. In order to facilitate and provide a more exact bending of the stamped-out sections, a nominal or desired bending location 6c can be notched which, likewise extends radially, as viewed in direction of the axis, as does the bending or bent away section 6d.

The plate-like bracing means 5, which can itself be formed of resilient or elastic material, is fastened or fixed to the holding means 6 by a bayonet-like locking or latching connection.

As shown especially in FIGS. 3 and 4, the plate-shaped bracing means 5 is provided with one part of the bayonet-like locking connection, and the holding means 6 represent the other part of the bayonet-like locking connection. For this purpose, a recess or cutout 7 is formed in the annular plate-shaped bracing means 5 for each of the holding means 6. By means of these recesses 7, the annular bracing means or ring 5 is able to be slipped in axial direction over the holding means 6. The bracing ring 5 also formed with noses or tabs 8 having a stop or detent contour 9 for a conventional tool engageable therewith to turn the ring 5 relatively to the holding means 6 and the cover 1. The bracing means 5 additionally have punched-out sections 10, one of which, after it has slid over one of the noses or projections 6a of the holding means 6 when the ring 5 is turned relative to the clutch and the holding means 6, engages behind the one projection 6a, while the other of the punched-out sections 10 is brought into a position wherein it is likewise directed (in opposite rotary direction) against a radially extending contour of one of the holding means 6, whereby security against rotation of the annular plate-like member 5 with respect to the remaining parts of the clutch, in both rotary directions, is afforded.

On the side of the noses or tabs 8 located opposite the contour 9, the annular plate-like member 5 is provided with engagement regions 13 for a conventional tool, by means of which loosening or releasing of the bracing means 5 from the clutch cover 1 by turning in the opposite rotary direction can be effected, for example, for repair purposes, of the construction of the bayonet-like locking connection or the antirotation device should require this.

In order to prevent the formation of fretting corrosion and wear between the annular plate-like member 5 and the holding means 6, the latter can have, at least in the region thereof that is engageable with the annular plate-like member 5, a hardness that is greater than that at all the other regions thereof. This can be effected, for example, by induction hardening or the like, or by applying a layer of wear-resistant material thereat.

In FIG. 5, there is again shown the holding or retaining means 6 initially stamped or punched out of the clutch cover 1 substantially in chord-like direction. On the side of the plate spring 2 facing away from the cover 1, the plate-like bracing member 5 is fastened to the holding means 6 by means of a rivet connection 6f formed on that side of the holding means 6.

The antirotation protective device can also be constructed, however, as shown in FIG. 6, by providing that punched-out tabs 10a come to lie on both sides of one-and-the-same holding means 6 and the nose or projection 6a extending therefrom.

As shown in FIG. 7, another embodiment of the antirotation protection device can also be formed, however, by providing beads or corrugations 11, 11' and a raised portion disposed therebetween on the annular plate-like member or ring 5 so as to lock with the holding means 6 or the nose or projection thereof.

As noted hereinbefore, the invention of the instant application is not limited to the illustrated embodiments but rather encompasses all embodiments wherein holding or retaining means which are formed integrally with the cover material and are produced by a punched-out section deviating from radial direction and by a bend deviating from a bend occurring in radial direction, for example, friction clutches with such holding means formed by, for example, a sickle-shaped punched-out section and then diverted substantially axially parallel.

There are claimed:

1. In a friction clutch wherein, for pivotally mounting a plate spring thereof at a clutch cover, the plate spring being formed with recesses, first bracing means are provided at the cover side of the plate spring and second bracing means are provided at the side of the plate spring facing away from the clutch cover and holding means for retaining the second bracing means, said holding means being punched out of the material of the clutch cover and bent away so as to extend through the recesses formed in the plate spring, said holding means being formed from the cover by a punched-out section originally extending in a direction substantially transverse to radial direction of the cover, said punched-out section being diverted so as to extend in a substantially radial plane and substantially perpendicularly to the plane of rotation of the clutch.

2. Friction clutch according to claim 1 wherein a nominal bending location is formed at the clutch cover and extends substantially in radial direction.

3. Friction clutch acording to claim 2 wherein said holding means has, at an end thereof directed away from said bending location, a holding region punched out therewith for retaining said second bracing means.

4. Friction clutch according to claim 3 wherein the second bracing means comprise an annular plate-like bracing member fixed by said holding region.

5. Friction clutch according to claim 4 wherein said annular plate-like bracing member is resilient.

6. Friction clutch according to claim 3 wherein said holding region comprises a projection formed on said holding means and extending in radial direction.

7. Friction clutch according to claim 3 wherein said holding region comprises a riveting connection of said holding means and said second bracing means.

8. Friction clutch according to claim 1 wherein said holding means have a bearing region at which it engages said second bracing means, said bearing region, at least at the surface thereof, having a hardness greater than that at the remaining region of said holding means.

9. Friction clutch according to claim 1 wherein said second bracing means comprise an annular plate-like bracing member formed with notches at a radially inner contour thereof, said notches having a width, as viewed in circumferential direction of said annular plate-like member, affording sliding of said annular plate-like member in axial direction over said holding means.

10. Friction clutch according to claim 1 wherein said second bracing means comprise an annular plate-like bracing member formed with contours engageable by a tool for rotation of said annular bracing member relative to said holding means.

11. Friction clutch according to claim 10 wherein said contours are engageable by the tool for rotation of said annular bracing member relative to said holding means in both directions of rotation.

12. Friction clutch according to claim 10 wherein said contours are formed of radially inwardly directed projections extending from said annular plate-like bracing member.

13. Friction clutch according to claim 1 wherein said second bracing means comprise an annular plate-like bracing member formed with radial recesses along the inner circumference thereof, said annular plate-like member being formed behind at least one of said radial recesses with an inclined surface rising in axial direction of the clutch, as viewed in circumferential direction of said annular plate-like member.

14. Friction clutch according to claim 13 wherein said inclined surface, as viewed in circumferential direction of said annular plate-like member, merges into a reversing surface extending in opposite axial direction.

15. Friction clutch according to claim 14 wherein, in connection with said reversing surface, as viewed in circumferential direction of said annular plate-like member, an additional inclined surface is formed on the annular plate-like member and projects in a direction corresponding to the direction in which the first-mentioned inclined surface extends.

16. Friction clutch according to claim 13, wherein said inclined surface is formed of a punched-out section extending substantially in circumferential direction.

17. Friction clutch according to claim 16 wherein an end of said punched-out section directed in one circumferential direction forms an antirotation protective device on a contour of said holding means extending in axial direction.

18. Friction clutch according to claim 17 including another antirotation protective device provided at said annular plate-like member and effective in the other circumferential direction, said other antirotation protective device being symmetric to a symmetry plane extending in radial direction.

19. Friction clutch according to claim 1 wherein said punched-out section originally extends in chordal direction of the clutch.

20. Friction clutch according to claim 1 wherein said punched-out section originally extends in circumferential direction of the clutch.

* * * * *